United States Patent [19]

Pugar et al.

[11] Patent Number: 4,935,214
[45] Date of Patent: Jun. 19, 1990

[54] PROCESS FOR PRODUCING HIGH PURITY SILICON NITRIDE BY THE DIRECT REACTION BETWEEN ELEMENTAL SILICON AND NITROGEN-HYDROGEN LIQUID REACTANTS

[75] Inventors: Eloise A. Pugar, Isla Vista; Peter E. D. Morgan, Thousand Oaks, both of Calif.

[73] Assignee: United States Department of Energy, Washington, D.C.

[21] Appl. No.: 380,695

[22] Filed: Jul. 14, 1989

Related U.S. Application Data

[63] Continuation of Ser. No. 96,527, Sep. 15, 1987, abandoned.

[51] Int. Cl.$^5$ ............................................. C01B 33/00
[52] U.S. Cl. ................................... 423/324; 423/344
[58] Field of Search ................................ 423/324, 344

[56] References Cited

U.S. PATENT DOCUMENTS

| | | | |
|---|---|---|---|
| 3,591,337 | 7/1971 | Lumbey | 423/344 |
| 4,686,095 | 8/1987 | Beckwith et al. | 423/344 |
| 4,724,131 | 2/1988 | Hashimoto et al. | 423/406 |
| 4,732,746 | 3/1988 | Crosbie et al. | 423/324 |

FOREIGN PATENT DOCUMENTS

| | | | |
|---|---|---|---|
| 705317 | 3/1965 | Canada | 423/344 |
| 53-23667 | 7/1978 | Japan | 423/344 |
| 55-130807 | 10/1980 | Japan | 423/344 |
| 56-22678 | 3/1981 | Japan | 423/344 |
| 60-42209 | 3/1985 | Japan | 423/344 |

*Primary Examiner*—Brian E. Hearn
*Assistant Examiner*—Andrew Griffis
*Attorney, Agent, or Firm*—L. E. Carnahan; Roger S. Gaither; William R. Moser

[57] ABSTRACT

A process is disclosed for producing, at a low temperature, a high purity reaction product consisting essentially of silicon, nitrogen, and hydrogen which can then be heated to produce a high purity alpha silicon nitride. The process comprises: reacting together a particulate elemental high purity silicon with a high purity nitrogen-hydrogen reactant in its liquid state (such as ammonia or hydrazine) having the formula: $N_nH_{(n+m)}$ wherein: $n=1-4$ and $m=2$ when the nitrogen-hydrogen reactant is straight chain, and 0 when the nitrogen-hydrogen reactant is cyclic. High purity silicon nitride can be formed from this intermediate product by heating the intermediate product at a temperature of from about 1200°–1700° C. for a period from about 15 minutes up to about 2 hours to form a high purity alpha silicon nitride product. The discovery of the existence of a soluble Si-N-H intermediate enables chemical pathways to be explored previously unavailable in conventional solid state approaches to silicon-nitrogen ceramics.

23 Claims, 1 Drawing Sheet

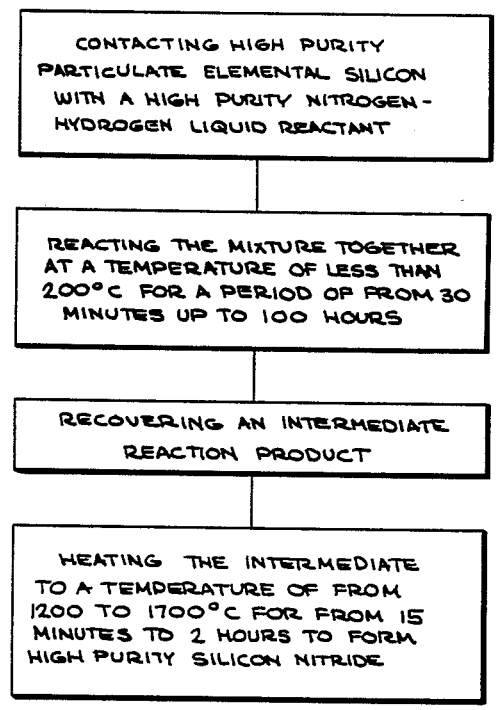

CONTACTING HIGH PURITY PARTICULATE ELEMENTAL SILICON WITH A HIGH PURITY NITROGEN-HYDROGEN LIQUID REACTANT

REACTING THE MIXTURE TOGETHER AT A TEMPERATURE OF LESS THAN 200°C FOR A PERIOD OF FROM 30 MINUTES UP TO 100 HOURS

RECOVERING AN INTERMEDIATE REACTION PRODUCT

HEATING THE INTERMEDIATE TO A TEMPERATURE OF FROM 1200 TO 1700°C FOR FROM 15 MINUTES TO 2 HOURS TO FORM HIGH PURITY SILICON NITRIDE

PROCESS FOR PRODUCING HIGH PURITY SILICON NITRIDE BY THE DIRECT REACTION BETWEEN ELEMENTAL SILICON AND NITROGEN-HYDROGEN LIQUID REACTANTS

This is a continuation of application Ser. No. 096,577, filed Sep. 15, 1987, now abandoned.

BACKGROUND OF THE INVENTION

The invention described herein arose in the course of, or under, Contract No. DE-AC03-85SF16018 between the United States Department of Energy and Rockwell International Corporation.

This invention relates to an improved process for the production of high purity silicon nitride which includes the manufacture of a novel liquid solution consisting essentially of silicon, hydrogen, and nitrogen dissolved therein which may be further employed as an intermediate in a variety of chemical synthetic preparations, including usage as a precursor for the production of silicon nitride. More particularly, this invention relates to the production of high purity silicon nitride by the reaction of elemental silicon with a nitrogen-hydrogen reactant in its liquid state to produce high purity intermediate materials consisting of silicon, nitrogen, and hydrogen from which high purity silicon nitride may be formed by heating the intermediate materials.

Silicon nitride is an important structural material having outstanding potential for use in high strength applications, such as cutting tools for aerospace alloys, ball bearings, etc. The material is currently contemplated for use at high temperatures in turbine blades and ceramic diesel engines. The dielectric properties of this material also enable silicon nitride to be an important component in semiconductor barriers.

It would be desirable to have an industrial process for manufacturing high purity silicon nitride using elemental silicon, which is inexpensively available in high purity and which could be reacted at ambient temperature in a continuous automated process with a nitrogen-hydrogen reactant in its liquid state to form a high purity intermediate product consisting of silicon, nitrogen, and hydrogen from which high purity silicon nitride could be formed directly upon heat treatment without additional purification steps.

The original investigation of low and high temperature direct reactions between elemental silicon and nitrogen compounds was conducted by E. Vigouroux, as quoted by J.W. Mellor in *A Comprehensive Treatise on Inorganic and Theoretical Chemistry*, Vol. VI, New York: Wiley, 1961, p. 163. He discovered that ammonia reacts with silicon at bright red heat, forming the nitride with liberation of hydrogen. High temperature nitridation of silicon is also detailed by Mangels U.S. Pat. No. 4,235,857 and is otherwise well known. However, ultra-high-purity silicon is extremely difficult to nitride at high temperature due to formation of protective nitride layers (exactly of the type used on semiconductors for passivation). According to S.S. Lin in an article entitled "Mass Spectrometric Studies on High Temperature Reaction Between Hydrogen Chloride and Silica/silicon" in the Journal Electrochem. Society, Vol. 123, 1976, pp. 512–514 and another article entitled "Comparative Studies of Metal Additives on the Nitridation of Silicon" in the Journal Am. Ceram. Soc., Vol. 60 (1-2), 1977, pp. 78–81; halide, iron, or other cation catalysts are required in such nitriding processes. D. Campos-Loriz et al, in an article entitled "The Effects of Hydrogen on the Nitridation of Silicon" in the Journal Mat. Sci., Vol. 14, 1979, pp. 1007–1008, and H. Dervisbegovic et al in an article entitled "The Role of Hydrogen in the Nitridation of Silicon Powder Compacts" in the Journal Mat. Sci, Vol. 16, 1979, pp. 1945–55, further explored the catalytic effects of hydrogen and water vapor on nitridation of silicon with a view to overcome the sluggishness and high expense of the process.

E. Vigouroux was cited in Mellor, p. 163, as unsuccessfully attempting to react silicon with liquid ammonia at low temperatures. These findings made it apparent to workers in the field that more reactive silicon derivatives, such as silicon chloride, silane, etc., would have to be employed to manufacture $Si_3N_4$ at temperatures below 100° C., the preferred temperature range for industrial processing.

Silicon nitride is, therefore, now industrially produced on the largest scale by the low temperature reaction of silicon tetrachloride with liquid ammonia as described in Iwai et al, U.S. Pat. No. 4,196,178. The amorphous silicon diimide intermediate may be crystallized to alpha silicon nitride upon heat treatment in a nitrogen atmosphere. However, the product formed tends to retain chloride on particle surfaces thereby not possessing the requisite purity needed for the above described desirable applications. Lengthy extractions with liquid ammonia or vacuum treatments to remove the halide from the final product incur additional processing costs. Oxygen contamination can result during this purification procedure due to the air and moisture sensitivity of the diimide intermediate. Even in the gas phase reaction between silicon tetrachloride and ammonia at temperatures over 700° C., chlorine and oxygen contamination cannot reasonably be eliminated as described by M. Rahaman et al in an article entitled "Surface Characterization of Silicon Nitride and Silicon Carbide Powders" in the Am. Ceram. Soc. Bull., Vol. 65 (8), 1986, pp. 1171–76.

The use of silicon halides as the source of silicon for reaction with a nitrogen-containing material to form silicon nitride is well known, and such reactions have been described in a number of U.S. Pat. Nos., such as, for example, Mazdiyasni et al 3,959,446; Buljan et al 4,073,845; Mazdiyasni et al 4,113,830; Sussmuth 4,122,220; Mehalchick et al 4,145,224; Kleiner et al 4,208,215; Inoue et al 4,368,180; Buljan et al 4,376,652; and Sato et al 4,399,115.

Formation of silicon nitride using a silane as the source of silicon for reaction with a nitrogen compound has also been proposed. Prochazka et al in U.S. Pat. No. 4,122,155 and Kasai et al in U.S. Pat. Nos. 4,346,068; 4,387,079; and 4,612,297 teach the use of a silane as the source of silicon in such a reaction. Usage of silane ($SiH_4$), a highly reactive gas at temperatures above −112° C., can be problematic due to its explosive nature, lengthy product deposition times, inadequate control of product stoichiometry and morphology, and the overall costly economics of the process. Reactions with halogen-substituted silanes, as cited in the latter two patents, can add impurity problems, requiring extra purification costs.

Synthesis of silicon nitride can be achieved at elevated temperatures (from 1000° C. to 1700° C.) by carbothermic nitriding of silicon dioxide. This method is described in U.S. Pat. Nos. Mori et al 4,122,152; Komeya et al 4,428,916; and Hasimoto et al 4,590,053.

Processes for producing silicon nitride from mono- and di- sulfides of silicon with ammonia have been demonstrated at high temperature in Forsyth U.S. Pat. No. 3,211,527 and Morgan et al U.S. Pat. No. 4,552,740. These synthetic routes are more attractive than the above mentioned high temperature methods because high reactivity and varied morphologies can be produced by vapor transport and VLS mechanisms. In addition, sulfur volatilizes more cleanly from the product.

It would be desirable to have a process wherein elemental silicon, which is available as a high purity starting material, could be reacted at a temperature, equivalent at atmospheric pressure to below 200° C., and preferably below 100° C., with a nitrogen-hydrogen reactant in its liquid state to form a high purity intermediate product consisting essentially of silicon, nitrogen, and hydrogen from which high purity silicon nitride can be formed by a heat treatment.

SUMMARY OF THE INVENTION

It is, therefore, an object of this invention to provide a process for forming high purity silicon nitride from elemental silicon and a reactive nitrogen-hydrogen compound that is in its liquid state at temperatures desirable for industrial purposes.

It is another object of this invention to provide a process for forming high purity silicon nitride from an initial reaction of elemental silicon and a reactive nitrogen-hydrogen liquid at a low temperature, i.e., below 200° C., and preferably below 100° C.

It is a further object of the invention to provide a process for forming high purity silicon nitride from an intermediate reaction product consisting essentially of silicon, nitrogen, and hydrogen which, in turn, is produced at a temperature below 200° C., and preferably below 100° C., from a reaction between high purity elemental particulate silicon and a high purity nitrogen-hydrogen reactant in its liquid state.

It is yet a further object of this invention to provide a process for making, at a temperature below 100° C., an intermediate product consisting essentially of silicon, nitrogen, and hydrogen.

These and other objects of the invention will be apparent from the following description and accompanying flow sheet.

BRIEF DESCRIPTION OF THE DRAWINGS

The sole figure is a flow sheet illustrating the process of the invention.

DETAILED DESCRIPTION OF THE INVENTION

High purity silicon nitride is produced, in accordance with the invention, by the initial formation of a high purity intermediate formed by reacting high purity elemental particulate silicon with a high purity nitrogen-hydrogen reactant in its liquid state at a temperature, equivalent at atmospheric pressure, to below 200° C., and preferably below 100° C. as showed in the reaction equation below:

wherein: n=1-4; and m=2 when the nitrogen-hydrogen reactant is straight chain and 0 when the nitrogen-hydrogen reactant is cyclic.

The high purity reactive nitrogen-hydrogen liquified compound, which will hereinafter be referred to as the $N_nH_{(n+m)}$ reactant, consists essentially of liquid ammonia ($NH_3$) when n=1 or a hydrazine ($N_nH_{n+m}$) when n is 2 or more. The preferable hydrazine compound is $N_2H_4$. However, the use of higher molecular weight hydrazines as the reactive nitrogen-hydrogen liquid, such as, for example, triazane ($N_3H_5$), tetrazine ($N_4H_6$), and isotetrazine ($N_4H_6$), as well as cyclic hydrazines such as cyclotriazane ($N_3H_3$), are also within the scope of the invention.

The purity of the high purity $N_nH_{(n+m)}$ reactant should be at least 99.9 wt.%, preferably 99.995 wt.%, to obtain the desired high purity intermediate. Liquid ammonia is easily obtainable in such purity, for example, by condensing it from the corresponding gas, while liquid anhydrous hydrazine ($N_2H_4$) at such a purity level is commercially available (in Mil Spec. grade) as a component of rocket fuel.

The other reactant comprises a elemental silicon in particulate form. The product of the reaction of elemental silicon with liquid ammonia is a solid imide which cannot easily be purified. Surprisingly, however, the reaction with liquid hydazine produces a clear liquid suggesting immediately that chemical methods of purification are possible in this instance. Therefore, the need for high purity silicon starting material may be avoidable when a liquid hydrazine is used and the use of lower purity silicon, e.g., 95 wt.% or higher, may even be economically preferable. The well known methods of purification for liquids: distillation, solvent extraction, crytallization, etc. could be applied in such a case.

Thus, the silicon purity requirements differ depending upon whether n=1 or greater than 1 for the $N_nH_{(n+m)}$ reactant. When n=2-4 (see Example II below), usage of high purity silicon is not required and a silicon of purity of 95 wt.% or higher may be used for this reaction. However, since product formed when n=1 (see Example I below) is not easily purified, the use of high purity silicon is necessitated when liquid ammonia is used as the other reactant. By high purity silicon is meant a silicon having a purity of 99.9 wt.% or better, preferably 99.999 wt.% pure.

The particle size range of the elemental silicon reactant is preferably about 100 mesh (Tyler) or smaller, i.e., below about 150 microns. Although larger particle sizes of silicon can be used to react with the $N_nH_{(n+m)}$ reactant, it will be appreciated that for a thorough and efficient reaction, it is important that the surface area of silicon in contact with the reactive nitrogen-hydrogen liquid be large. Larger silicon particles, even lumps (i.e., 2.5 cm. diameter) with reduced surface area will react more slowly. Use of such large particles could be desirable in a continuous flow of reactants in an industrial process application of this invention. The lower limit of the silicon particle size will be governed by the availability of smaller particles as well as safety limitations from the standpoint of the extent of the pyrophoric properties of the fine particles. A range of particle size of from about 0.01 microns (colloidal) up to about 100 mesh (Tyler), preferably from about 0.01 to 150 microns, will provide particles which will react quickly and thoroughly with the $N_nH_{(n+m)}$ reactant without incurring undue safety risks.

If larger particle sizes of silicon are used, e.g., larger than 100 mesh (Tyler), such particles may be ground prior to the reaction, or in situ during the reaction as will be discussed below, under conditions which will not compromise the desired purity. For example, larger silicon particles may be ground using large lumps of silicon as a milling agent.

Since it is recognized that silicon is technically a metalloid and not a metal, the term "elemental" is used herein with respect to the silicon reactant to define that the element silicon, i.e., reduced silicon and not a silicon compound, is what is being referred to as the high purity reactant.

In accordance with the invention, the $N_nH_{(n+m)}$ reactant and the particulate elemental silicon reactant are reacted together at a low temperature, comprising a temperature below the boiling point of the $N_nH_{(n+m)}$ reactant at the pressure employed, and preferably from about 15° C. to about 100° C. below the equivalent boiling point at the pressure employed. For example, when the reactive nitrogen-hydrogen liquid is ammonia, the reaction temperature, at atmospheric pressure, will be below −33° C. When hydrazine is used as the liquid reactant, the reaction temperature, at atmospheric pressure, will be below 113° C. and preferably below about 98° C.

The term "low temperature", as used herein, is intended to define a temperature, equivalent at atmospheric pressure, of under 200° C., preferably under 100° C., to distinguish this process from prior art processes wherein temperatures of over 1000° C. are used in the initial reaction between the silicon-containing reactant and the nitrogen-containing reactant.

The preferred reaction temperature range, when ammonia is reacted, is a temperature range, equivalent at atmospheric pressure, from about −33° C. to about −78° C. The preferred reaction temperature range, when hydrazine ($N_2H_4$) is reacted, is a temperature range, equivalent at atmospheric pressure, from about 0° C. to about 75° C., most preferably about 15° C. to 50° C.

It should be noted that the above discussion with regard to reaction temperature ranges has been phrased in language indicating temperatures equivalent to the recited temperatures at atmospheric pressure because it is recognized that the reaction may very well be carried out at other than atmospheric pressure. For example, when liquid ammonia is used as the $N_nH_{(n+m)}$ reactant, it may be more advantageous to react the liquid ammonia with the particulate silicon at a temperature higher than −33° C. by raising the pressure, e.g., reacting at room temperature under 12 atmospheres of pressure. Thus it will be recognized that the reaction temperature ranges discussed are not absolutes, but are relative to the pressure employed.

The reaction time of the reactants (or residence time for a continuous reaction) will vary depending upon the reactants, the temperature/pressure at which the reaction is carried out, and other reaction conditions as will be discussed below. The reaction time, for a batch reaction containing specified quantities of reactants (e.g., 50 ml. $N_nH_{(n+m)}$ and 5 grams silicon of 1 micron particle size), may vary from less than one hour to as many as 100 hours, preferably from about 30 minutes to about 50 hours. Longer reaction time periods, are possible, given greater particle sizes of silicon and surface buidup of the $SiO_2$ layer.

For example, the batch reaction of hydrazine with particulate elemental silicon at 25° C. (atmospheric pressure) may be carried to completion in several hours while the batch reaction of liquid ammonia with particulate elemental silicon at −78° C. (atmospheric pressure) may be carried out in 48 hours.

The reaction time may be accelerated, in accordance with a preferred embodiment of the invention, by conducting a grinding or milling action during the reaction. This is thought to accelerate the reaction by constantly exposing fresh unreacted silicon surfaces and contacting them with the $N_nH_{(n+m)}$ reactant. For example, a reaction between 100 mesh (Tyler) silicon particles and liquid ammonia at −78° C. at atmospheric pressure may be shortened from 48 hours or more down to 1 hour or less by milling the silicon particles during the reaction with the liquid ammonia reactant.

Such milling or grinding of the elemental silicon serves to remove any coatings on the surface of the elemental silicon (i.e., $SiO_2$) which, but for such removal, might interfere with the reaction between the silicon and the $N_nH_{(n+m)}$ reactant. Such coatings may also be optionally removed prior to the reaction by chemical treatment of the particulate silicon with stripping reagents such as hydrofluoric acid or ammonium bifluoride and/or heat treatment to at least 1300° C. in a reducing atmosphere such as an argon/hydrogen atmosphere to promote the reaction time considerably, e.g., to less than 0.5 hours.

It should be noted that when such grinding or milling is carried out as a part of the reaction, the use of larger size elemental silicon particles, i.e., particles larger than 100 mesh (Tyler) can be used which will be ground down in situ during the progress of the reaction. It should be further noted that the reaction may be carried out on a continuous basis with product removed as it is produced, or on a periodic basis, and the use of large size elemental silicon particles which are ground in situ during the course of the reaction may be of particular value when the process is run on a continuous basis and liquid, containing the intermediate product formed by the reaction, is continuously removed from the reaction zone, leaving the large particles of elemental silicon to be further ground and reacted with fresh $N_nH_{(n+m)}$ reactant, continuously fed into the reaction zone.

When the reaction is carried out on a batch basis, the $N_nH_{(n+m)}$ reactant may be used in stoichiometric excess which then permits recovery of the reaction product by solvent evaporation of the remaining $N_nH_{(n+m)}$ reactant. When a continuous process is used, liquid may be continuously removed from the reaction zone containing both the intermediate product and the $N_nH_{(n+m)}$ reactant which may then be separated from the intermediate product and recycled back to the reaction zone if desired.

The intermediate solution, formed by this reaction, comprises a solution or dispersion consisting of silicon, nitrogen, and hydrogen, with less than about 5–10 ppm impurities. This intermediate product may be employed in applications which require one or more elements in liquid form, e.g., such as for polymer processing to fibers. The intermediate product formed in accordance with the invention could also be used as a reagent in a wide range of chemistry to synthesize complex molecules containing silicon, nitrogen, and hydrogen, and possibly other elements. In turn, this intermediate can also be used to produce silicon ceramics (e.g., silicon nitride or silicon carbide) by appropriate reaction paths. For example, the intermediate could be heated to 800° C. in an argon atmosphere to produce silicon nitride with ammonia and hydrogen gas.

As stated above, recovery of the intermediate reaction product can be carried out by solvent evaporation of the remaining $N_nH_{(n+m)}$ reactant. When the $N_nH_{(n+m)}$ reactant is hydrazine, the product is a clear stable solution which deposits a white residue upon evaporation. Infrared analysis of the solution shows a peak splitting of the N-N stretch (normally centered at approximately 1098 cm$^{-1}$) to two peaks of equal intensity at 1050 and 1120 cm$^{-1}$ which may arise from Si-N association in solution and does not indicate the presence of any elements other than silicon, nitrogen, and hydrogen in amounts over 0.05 wt.% indicating that the solution is of high purity.

After evaporation of the solvent, high purity crystalline alpha silicon nitride ($Si_3N_4$), i.e., an alpha silicon nitride product having a purity of at least 99.9 wt.%, preferably 99.995 wt.%, can be formed from the amorphous intermediate powder residue by heating the residue up to a temperature range of about 1200°–1700° C. in a non-reactive atmosphere, such as argon, and then maintaining the residue at this temperature for at least about 15 minutes up to about 2 hours. Longer time periods may be employed but are thought to be unnecessary to achieve complete conversion of the residue to alpha $Si_3N_4$ having a particle size range of about 0.01 to 0.5 microns. It should be noted that the detection of the final product as alpha silicon nitride is another indication of the cationic purity of the material because it is known that lower purity amorphous silicon nitride generally forms beta silicon nitride as well as the alpha form upon high temperature heat treatment. On the other hand, if beta silicon nitride is a desired product, this can be achieved by adding agents known to promote the formation of the beta form.

The following examples will serve to better illustrate the process of the invention.

EXAMPLE I

Ammonia gas was liquified over a six hour period in a polyethylene bottle using dry ice at about −78° C. to produce 50 milliliters of liquid ammonia which was then contacted with 5 grams of particulate silicon having a particle size of 1 micron or less and a purity of 99.9 wt.%. The reactants were milled in the reaction vessel for three hours at a temperature of −78° C. for 48 hours. The intermediate was recovered by evaporation of the remaining $NH_3$ as a brown colored residue.

This residue was found to be amorphous by X-ray diffraction with some unreacted silicon, hence the brown color. Infrared spectroscopy of the residue showed peaks distinct from a silicon IR reference pattern. Sharp absorptions were found at 1180 cm$^{-1}$, 1210 cm$^{-1}$, and 3000 cm$^{-1}$ associated with the presence of NH and $NH_2$ groups and a heightened shoulder between 960–1050 cm$^{-1}$ due to the broad Si-N stretch. Scanning electron microscopy (SEM) inspection of the residue revealed non-crystalline matter interdispersed among silicon particles.

The residue was heated to a temperature of 1300° C. in argon for two hours. Possible oxygen contamination was avoided with a double enclosed crucible arrangement with silicon nitride powder surrounding the walls of the inner crucible. The resulting product yielded an x-ray pattern indicative of alpha silicon nitride at 1400° C. and unreacted silicon. The formation only of alpha silicon nitride at 1400° C., as well as SEM EDS analysis in which only silicon was found (nitrogen cannot be detected), confirms the high purity of the reaction product.

EXAMPLE II

To 50 milliliters of liquid hydrazine was added 0.05 grams of particulate silicon having an average particle size of about or less than 10 micron and a purity of greater than 99.9 wt.% and the mixture was reacted in a reaction vessel under an inert Argon atmosphere for 3 hours at a temperature of 25° C. The resulting reaction product was a clear solution containing silicon as confirmed by inductively coupled plasma atomic absorption.

Vacuum solvent evaporation of the hydrazine left a polymeric residue which exhibited an IR absorption band at 950 cm$^{-1}$ due to the Si-N stretch, a broad N-N stretch between 1100–1220 cm$^{-1}$, and the wags and anti-symmetrical stretches due to NH, $NH_2$ groups in the 1250–1600 cm$^{-1}$ and broad stretch 2800–3500 cm$^{-1}$ regions respectively. The product generated a broad band Raman peak centered at 800 cm$^{-1}$ which flattens with air exposure. Heating the residue in air caused disappearance of the Si-N, NH, and $NH_2$, groups with replacement by SiO at 1150 cm$^{-1}$. The $Si/N_2H_4$ intermediate complex also absorbs in the ultraviolet at 240, 288, and a broad shoulder at 278 nm. The near ultraviolet transition at 288 nm may indicate some double bonded nitrogens, i.e., —N=N— due to an electronic transition from the pi orbital state to an antibonding pi orbital state. The electronic transition from the ground state to an antibonding sigma orbital state normally seen at 220 nm in silanylhydrazine complexes is red-shifted to 240 nm. Back donation from nitrogen to silicon may be inhibited due to the multiple nitrogen-nitrogen linkage. Thermal gravimetric analysis in argon of the residue showed a 79 wt.% loss. This corresponds to approximately six $N_2H_4$ molecules to every silicon atom. X-ray diffraction analysis of the intermediate product showed it to be amorphous. SEM inspection indicated that the intermediate product residue after evaporation is a fine colloidal powder.

The residue was subsequently heated at a temperature of 1400° C. for three hours in an argon atmosphere under a nitrogen buffer as described in Example I. Finely divided white crystals were recovered which X-ray diffraction indicated to be alpha $Si_3N_4$.

EXAMPLE III

To further characterize the intermediate compound formed by the reaction between elemental silicon and the $N_nH_{(n+m)}$ reactant, the local silicon environment was analyzed by $^{29}$silicon NMR to determine the type of bonding present in the intermediate product in a hydrazine solution. Peaks were found at −73.1 ppm and −82.06 ppm, characteristic of silicon-nitrogen bonding. No other peaks of any significant magnitude were noted indicating that silicon-nitrogen-hydrogen bonding predominates in the intermediate compound. In particular, no silicon-hydrogen bonding was detected by using INEPT Cross Polarization Techniques such as described by David T. Pegg and M. Robin Bendall in "Polarization Transfer Between Two Scalar-Coupled Systems of Arbitrary Numbers of Nuclei of Arbitrary Spins", Journal of Magnetic Resonance, Vol. 55 (1983), pp. 51–63.

The sample was also analyzed by proton NMR. The proton chemical shift was as typically well known in silyl-amines. This shows that hydrogen is bonded through nitrogen to silicon, i.e., not simply a nitrogen-hydrogen bond as in the hydrazine solvent. This confirms the reaction between the elemental silicon and the $N_nH_{(n+m)}$ reactant. Furthermore, since the $^{29}$silicon NMR analyses indicated no direct silicon-hydrogen bonding, the intermediate compound must comprise a compound having silicon-nitrogen-hydrogen bonding.

While a specific embodiment of the process for forming high purity $Si_3N_4$ and its precursors has been illustrated and described in accordance with this invention, modifications and changes of the apparatus and process, including parameters and materials, etc. will become apparent to those skilled in the art, and it is intended to cover in the appended claims all such modifications and changes which come within the scope of the invention.

What is claimed is:

1. A process for forming a high purity material consisting essentially of silicon, nitrogen, and hydrogen by the reaction of particulate elemental silicon with a nitrogen-hydrogen reactant in its liquid state at a low reaction temperature which comprises:
   (a) removing surface coatings on said particulate elemental silicon to promote reaction between said silicon and said nitrogen-hydrogen reactant; and
   (b) reacting said particulate elemental silicon at a temperature, equivalent at atmospheric temperature, of under about 200° C. with a nitrogen-hydrogen reactant having the formula:

$$N_nH_{(n+m)}$$

wherein: n=1-4; and m=2 when the nitrogen-hydrogen reactant is a straight chain, and 0 when the nitrogen-hydrogen reactant is cyclic.

2. The process of claim 1 wherein said surface coatings on said elemental silicon particulate are removed by chemical treatment of said silicon with a reagent capable of removing said coating.

3. The process of claim 1 wherein said surface coatings on said elemental silicon particulate are removed by heating said particulate to a temperature of at least 1300° C. in a reducing atmosphere.

4. The process of claim 1 wherein said surface coatings on said elemental particulate silicon are removed by milling said particulate silicon during said reaction of said particulate silicon with said $N_nH_{(n+m)}$ reactant.

5. The process of claim 1 wherein said elemental silicon has a purity of 99.9 wt.% or greater when n=1 and 95 wt.% or greater when n=2-4.

6. The process of claim 1 wherein said elemental silicon has a purity of at least 99.9 wt.%.

7. The process of claim 6 wherein said particulate elemental silicon has a purity of at least 99.999 wt.%.

8. The process of claim 1 wherein said particulate elemental silicon used in said reaction has a particle size range of from about 0.01 microns to about 100 mesh (Tyler).

9. The process of claim 8 wherein said particulate elemental silicon used in said reaction has a particle size range of from about 0.01 microns to about 150 microns.

10. The process of claim 1 wherein said $N_nH_{(n+m)}$ reactant comprises a compound having a boiling point, equivalent at atmospheric pressure, of under 200° C.

11. The process of claim 10 wherein said $N_nH_{(n+m)}$ reactant is selected from the class consisting of ammonia; a hydrazine having the formula $N_nH_{(n+2)}$ where n=2-4; a cyclic hydrazine having the formula $N_nH_n$, where n=3-4; and mixtures thereof.

12. The process of claim 11 wherein said $N_nH_{(n+m)}$ reactant consists essentially of ammonia and said reaction temperature range is a temperature, equivalent at atmospheric pressure, of from about −40° C. to about −125° C.

13. The process of claim 11 wherein said $N_nH_{(n+m)}$ reactant consists essentially of hydrazine ($N_2H_4$) and said reaction temperature range is a temperature, equivalent at atmospheric pressure, of from about 0° C. to about 100° C.

14. The process of claim 1 wherein said low reaction temperature ranges from about 15° C. to about 100° C. below the boiling point of said $N_nH_{(n+m)}$ reactant.

15. The process of claim 1 wherein said $N_nH_{(n+m)}$ reactant is present in stoichiometric excess with respect to said elemental silicon reactant.

16. The process of claim 1 wherein said elemental silicon is reacted with said $N_nH_{(n+m)}$ reactant for a period of from about less than 1 hour up to about 100 hours.

17. The process of claim 16 wherein said reaction time is from about 30 minutes up to about 50 hours.

18. The process of claim 1 wherein said process is run on a continuous basis and said reactants have a contact time together of from less than 1 hour up to about 100 hours.

19. The process of claim 1 including the further step of heating said reaction product to a temperature of from about 1200°–1700° C. in a nonreactive atmosphere to convert said reaction product to a crystalline material consisting essentially of alpha silicon nitride.

20. A process for producing, at a temperature, equivalent at atmospheric temperature, to not more than about 100° C., a high purity reaction product consisting essentially of silicon, nitrogen, and hydrogen which comprises: reacting together elemental particulate silicon having a particle size range of from about 0.01 to 150 microns and a purity of at least about 99.9 wt.% with a reactive nitrogen-hydrogen liquid having the formula:

$$N_nH_{(n+m)}$$

wherein:
   n=1–4 and
   m=2 for a straight chain configuration; or
   m=0 for a cyclic configuration;
while simultaneously milling said elemental particulate silicon during said reaction of said silicon with said $N_nH_{(n+m)}$ reactant to reduce the particle size of said silicon particulate, to accelerate the reaction time by exposing fresh surfaces of said silicon particulate for reaction with said $N_nH_{(n+m)}$ reactant, and to remove surface coatings on said particulate elemental silicon.

21. A process for continuously producing a high purity reaction product consisting essentially of silicon, nitrogen, and hydrogen from particulate metallic silicon and a reactive nitrogen-hydrogen liquid which comprises:
   (a) milling in a reaction vessel elemental silicon particles having a purity of at least 99.9 wt.%, at a temperature, equivalent at atmospheric pressure, of under 200° C. in the presence of a reactive nitrogen-hydrogen liquid selected from the class consisting of ammonia; a hydrazine having the formula $N_nH_{(n+2)}$ where n=2–4; a cyclic hydrazine having the formula $N_nH_n$, where n=3–4; and mixtures thereof to cause said reactive nitrogen-hydrogen liquid to react with the exposed surfaces of the milled elemental silicon particles to form an intermediate reaction product;

(b) continuously removing liquid from said reaction vessel containing an intermediate product consisting essentially of silicon, nitrogen, and hydrogen; and (c) recovering a solid intermediate product from said liquid containing said intermediate product.

22. A process for producing, at a low reaction temperature, a high purity silicon nitride from particulate elemental silicon and a nitrogen-hydrogen reactant in its liquid state which comprises:

(a) removing surface coatings on said particulate elemental silicon to promote reaction between said silicon and said nitrogen-hydrogen reactant;

(b) reacting together, at a temperature, equivalent at atmospheric pressure, of less than 200° C., a particulate elemental silicon having a particle size range of from about 0.01 to 150 microns and a purity of at least about 99.9 wt.% and a nitrogen-hydrogen reactant in its liquid state having the formula: $N_nH_{(n+m)}$ wherein: n=1-4, and m=2 when the nitrogen-hydrogen reactant is straight chain and 0 when the nitrogen-hydrogen reactant is cyclic, to form an intermediate reaction product; and (c) heating said intermediate reaction product to a temperature of from about 1200°-1700° C. in a nonreactive atmosphere to convert said intermediate reaction product to a crystalline material consisting essentially of alpha silicon nitride.

23. A process for continuously producing high purity silicon nitride from particulate metallic silicon and a reactive nitrogen-hydrogen liquid which comprises:

(a) milling in a reaction vessel elemental silicon particles having a purity of at least 99.9 wt.%, at a temperature, equivalent at atmospheric pressure, of under 200° C. in the presence of a reactive nitrogen-hydrogen liquid selected from the class consisting of ammonia; a hydrazine having the formula $N_nH_{(n+2)}$ where n=2-4; a cyclic hydrazine having the formula $N_nH_n$, where n=3-4; and mixtures thereof to cause said reactive nitrogen-hydrogen liquid to react with the exposed surfaces of the milled elemental silicon particles to form an intermediate reaction product;

(b) continuously removing liquid from said reaction vessel containing said intermediate reaction product consisting essentially of silicon, nitrogen, and hydrogen;

(c) recovering a solid intermediate product from said liquid containing said intermediate product; and (d) heating said intermediate product at a temperature of from about 1200°-1700° C. for a period of from about 15 minutes up to about 2 hours to convert said intermediate product to high purity alpha silicon nitride.

* * * * *